United States Patent
Kim et al.

(10) Patent No.: US 12,221,582 B2
(45) Date of Patent: Feb. 11, 2025

(54) METHOD AND APPARATUS FOR PRODUCING HIGH VALUE-ADDED OIL FROM WASTE PLASTIC PYROLYSIS OIL

(71) Applicants: SK Innovation Co., Ltd., Seoul (KR); SK Geo Centric Co., Ltd., Seoul (KR)

(72) Inventors: Ka Young Kim, Daejeon (KR); Ok Youn Kim, Daejeon (KR); Young Moo Park, Daejeon (KR); Hee Jung Jeon, Daejeon (KR)

(73) Assignees: SK Geo Centric Co., Ltd., Seoul (KR); SK Innovation Co., Ltd., Seoul (KR)

( * ) Notice: Subject to any disclaimer, the term of this patent is extended or adjusted under 35 U.S.C. 154(b) by 139 days.

(21) Appl. No.: 17/941,068

(22) Filed: Sep. 9, 2022

(65) Prior Publication Data
US 2023/0093149 A1  Mar. 23, 2023

(30) Foreign Application Priority Data
Sep. 10, 2021  (KR) .................. 10-2021-0120894

(51) Int. Cl.
  *C10G 65/12* (2006.01)
  *B01J 19/24* (2006.01)
  *C10G 1/00* (2006.01)
  *C10G 1/10* (2006.01)

(52) U.S. Cl.
  CPC .......... *C10G 65/12* (2013.01); *B01J 19/245* (2013.01); *C10G 1/002* (2013.01); *C10G 1/10* (2013.01); *B01J 2219/0004* (2013.01); *C10G 2300/1003* (2013.01); *C10G 2300/202* (2013.01); *C10G 2300/301* (2013.01); *C10G 2300/4006* (2013.01); *C10G 2300/4018* (2013.01)

(58) Field of Classification Search
  CPC .......... C10G 65/12; C10G 1/002; C10G 1/10; C10G 2300/1003; C10G 2300/202; C10G 2300/301; C10G 2300/4006; C10G 2300/4018; C10G 2400/02; C10G 2400/08; C10G 45/08; C10G 45/72; C10G 47/02; C10G 47/36; C10G 65/06; B01J 19/245; B01J 2219/0004; Y02W 30/62
  See application file for complete search history.

(56) References Cited

U.S. PATENT DOCUMENTS

| | | | |
|---|---|---|---|
| 2009/0253948 A1* | 10/2009 | McCall | C10G 3/47 585/240 |
| 2016/0264874 A1* | 9/2016 | Narayanaswamy | C10G 1/10 |
| 2019/0161683 A1* | 5/2019 | Narayanaswamy | C10G 69/14 |

(Continued)

FOREIGN PATENT DOCUMENTS

| | | |
|---|---|---|
| CN | 103980938 A | 8/2014 |
| CN | 104560169 B | 5/2016 |

(Continued)

*Primary Examiner* — Ali Z Fadhel
(74) *Attorney, Agent, or Firm* — The Webb Law Firm

(57) ABSTRACT

A method and apparatus for refining waste plastic pyrolysis oil has an effect of converting the waste plastic pyrolysis oil into high value-added hydrocarbon oil having a high content of naphtha and kerosene, lowering a content of impurities such as chlorine, nitrogen, oxygen, and metal of the hydrocarbon oil, operating under milder process conditions, having excellent process efficiency, and having high process stability to be able to continuously produce refined oil.

16 Claims, 1 Drawing Sheet

(56) References Cited

U.S. PATENT DOCUMENTS

| | | | | |
|---|---|---|---|---|
| 2019/0299491 A1* | 10/2019 | Stanislaus | ............... | B01J 29/85 |
| 2021/0395620 A1* | 12/2021 | Andersson | ............... | C10G 3/45 |
| 2022/0097279 A1* | 3/2022 | Van Zijl | ................. | C10G 51/023 |
| 2023/0002688 A1* | 1/2023 | Weiss | .................... | C10G 69/06 |
| 2023/0013013 A1* | 1/2023 | Koseoglu | ............... | C10G 35/00 |
| 2023/0029587 A1* | 2/2023 | Weiss | .................... | C10G 69/06 |
| 2023/0183579 A1* | 6/2023 | Zijl Van | .................. | C10G 1/10 585/241 |
| 2023/0272292 A1* | 8/2023 | Weiss | ....................... | C10G 1/10 585/241 |
| 2023/0272293 A1* | 8/2023 | Weiss | .................... | C10G 69/06 585/241 |
| 2023/0287283 A1* | 9/2023 | Weiss | .................... | C10G 65/12 |
| 2023/0348799 A1* | 11/2023 | Odjo | ..................... | B01D 5/009 |
| 2023/0357652 A1* | 11/2023 | Sala | ....................... | C10G 45/58 |
| 2023/0416612 A1* | 12/2023 | Adam | .................... | C10G 45/44 |
| 2024/0059629 A1* | 2/2024 | Goyheneix | ............ | C10G 1/002 |
| 2024/0059977 A1* | 2/2024 | Weiss | .................... | C10G 45/44 |

FOREIGN PATENT DOCUMENTS

| | | |
|---|---|---|
| CN | 105001910 B | 9/2016 |
| CN | 107304373 B | 3/2019 |
| FR | 3107530 A1 | 8/2021 |
| KR | 1020200144791 A | 12/2020 |
| WO | 2021110395 A1 | 6/2021 |

\* cited by examiner

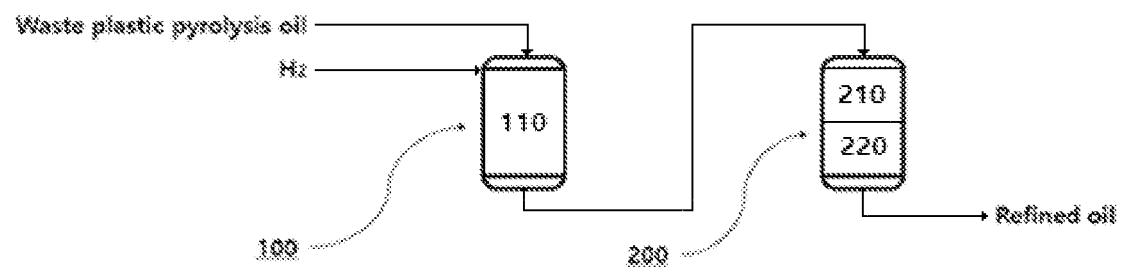

METHOD AND APPARATUS FOR PRODUCING HIGH VALUE-ADDED OIL FROM WASTE PLASTIC PYROLYSIS OIL

CROSS-REFERENCE TO RELATED APPLICATION

This application claims priority to Korean Patent Application No. 10-2021-0120894, filed Sep. 10, 2021, the disclosure of which is hereby incorporated by reference in its entirety.

BACKGROUND OF THE INVENTION

Field of the Invention

The following disclosure relates to a method and apparatus for producing high value-added oil from waste plastic pyrolysis oil.

Description of Related Art

Waste plastics are produced using petroleum as a raw material, and are mostly being disposed of as waste due to low recyclability. Since such wastes take a long time to be decomposed in a natural state, the wastes pollute soil and cause serious environmental pollution. As a method for recycling waste plastics, there is a method of pyrolyzing waste plastics and convert the waste plastics into usable oil. Such oil is called waste plastic pyrolysis oil. However, since the pyrolysis oil obtained by pyrolyzing the waste plastics has a higher content of impurities such as chlorine, nitrogen, and metal compared to oil produced from crude oil by the conventional process, it is difficult to use the pyrolysis oil as a high value-added fuel such as gasoline and diesel oil. Therefore, a method different from the general crude oil refining process is required to convert waste plastics into usable oil.

In addition, the conventional method of refining waste plastic pyrolysis oil is difficult to convert the waste plastic pyrolysis oil into high value-added oil having a high content of naphtha and kerosene. Conventionally, Korean Patent Laid-Open Publication No. 10-2020-0144791 discloses a 'Method of hydrotreating heavy oil', but the patent is a method for refining heavy oil mainly containing an oil component having a boiling point of 340° C. or higher. When the method is applied to waste plastic pyrolysis oil, process efficiency is lowered, and especially, it is difficult to convert the waste plastic pyrolysis oil into a high content of high value-added oil such as naphtha and kerosene.

Therefore, even when refined oil is produced from the waste plastic pyrolysis oil, a technology capable of increasing the content of components such as naphtha and kerosene in the refined oil and refining waste plastic pyrolysis oil having with excellent process efficiency and refining effect is required.

RELATED ART DOCUMENT

Patent Document (Patent Document 1) Korean Patent Laid-open Publication No. 10-2020-0144791

SUMMARY OF THE INVENTION

An embodiment of the present invention is directed to providing a method and apparatus for refining waste plastic pyrolysis oil capable of converting the waste plastic pyrolysis oil into high value-added hydrocarbon oil having a high content of naphtha and kerosene.

Another embodiment of the present invention is directed to providing a method and apparatus for refining waste plastic pyrolysis oil capable of producing refined oil having a remarkably low content of impurities such as chlorine, nitrogen, oxygen, and metal.

Still another embodiment of the present invention is directed to providing a method and apparatus for refining waste plastic pyrolysis oil that can operate under milder process conditions, have excellent process efficiency, and have process stability to be able to continuously produce refined oil.

In one general aspect, a method of refining waste plastic pyrolysis oil includes: a reactant introducing step of introducing the waste plastic pyrolysis oil containing light oil component and a hydrogen gas into a first reactor; a first hydrotreating step of producing first refined oil, from which impurities are primarily removed, by performing a primary hydrotreating reaction on the waste plastic pyrolysis oil in the first reactor under a first hydrotreating catalyst; an intermediate product introducing step of introducing a fluid containing the first refined oil introduced in the first hydrotreating step into a second reactor having a reaction space including a first region and a second region and introducing the fluid into the first region; a second hydrotreating step of producing second refined oil, from which impurities are secondarily removed, by performing a secondary hydrotreating reaction on an oil component in the fluid under a second hydrotreating catalyst in the first region; and a hydrocracking step of producing third refined oil containing naphtha and kerosene by performing a hydrocracking reaction on an oil component in a fluid containing the second refined oil introduced from the first region under a hydrocracking catalyst in the second region.

In the hydrotreating step or the hydrocracking step, the reaction may be performed at a pressure of 10 to 120 bar.

A ratio of a liquid hourly space velocity (LHSV) of the first region and the second region may be 1:1 to 10.

A ratio of a liquid hourly space velocity (LHSV) of the first reactor and the second reactor may be 1:0.1 to 0.8.

The primary hydrotreating reaction may include a dechlorination reaction, and the secondary hydrotreating reaction may include a denitrification reaction.

A temperature of the secondary hydrotreating reaction and a temperature of the hydrocracking reaction may be higher than that of the primary hydrotreating reaction.

The temperature of the first hydrotreating reaction may be 100° C. or higher and less than 300° C., and the temperature of the secondary hydrotreating reaction and the temperature of the hydrocracking reaction may be 300 to 500° C. from each other.

In the first hydrotreating step, the second hydrotreating step, or the hydrocracking step, the waste plastic pyrolysis oil and a hydrogen gas may react at a volume flow ratio of 1:300 to 3,000 based on 1 atm and 25° C.

The waste plastic pyrolysis oil may be hydrocarbon oil containing 1 to 40 wt % of first oil component having a boiling point of less than 150° C., 1 to 50 wt % of second oil component having a boiling point of 150° C. or higher and less than 265° C., 1 to 50 wt % of third oil component having a boiling point of 265° C. or higher and less than 340° C., and 1 to 60 wt % of fourth oil component having a boiling point of 340° C. or higher, and the light oil component may include the first oil component and the second oil component.

The third refined oil produced in the hydrocracking step may contain 10 wt % or more of naphtha and 25 wt % or more of kerosene.

The first hydrotreating catalyst, the second hydrotreating catalyst, or the hydrocracking catalyst may be a heterogeneous catalyst fixed inside each reactor.

The first hydrotreating catalyst, the second hydrotreating catalyst, or the hydrocracking catalyst may be a catalyst in which an active metal containing any one or two or more selected from molybdenum, nickel, cobalt, and tungsten is supported on a support. In another general aspect, an apparatus for refining waste plastic pyrolysis oil includes: a first reactor in which the waste plastic pyrolysis oil and a hydrogen gas are introduced, and the waste plastic pyrolysis oil undergoes a primary hydrotreating reaction under a first hydrotreating catalyst to produce first refined oil from which impurities are primarily removed; and a second reactor having, as inner space, a first region and a second region in which a fluid containing the first refined oil is introduced from the first reactor and an oil component and a hydrogen gas in the fluid react, in which the first region may be a region in which second refined oil from which impurities are secondarily removed is produced by performing a secondary hydrotreating reaction on the oil component in the fluid introduced from the first reactor under a second hydrotreating catalyst, and the second region may be a region in which a fluid containing second refined oil is introduced from the first region, and the oil component in the fluid undergoes a hydrocracking reaction under a hydrocracking catalyst to produce third refined oil containing naphtha and kerosene.

The second region may be formed under the first region, and a fluid containing the second refined oil and an unreacted hydrogen gas discharged from the first region may be introduced into the second region.

The first region and the second region may be controlled to maintain a reaction pressure of 10 to 120 bar.

The reactor may be controlled so that a ratio of a liquid hourly space velocity (LHSV) of the first region and the second region is 1:1 to 10.

A ratio of a liquid hourly space velocity (LHSV) of the first reactor and the second reactor may be controlled to be 1:0.1 to 0.8.

A temperature of the first hydrotreating reaction may be 100° C. or higher and less than 300° C., and a temperature of the secondary hydrotreating reaction and a temperature of the hydrocracking reaction may be 300 to 500° C. independently from each other.

BRIEF DESCRIPTION OF THE DRAWINGS

FIG. 1 is a diagram schematically illustrating an apparatus for refining waste plastic pyrolysis oil including a first reactor and a second reactor according to the present invention.

DETAILED DESCRIPTION OF MAIN ELEMENTS

100: First reactor
110: Inner space (first hydrotreating reaction region) of first reactor
200: Second reactor
210: First region (second hydrotreating reaction region) of second reactor
220: Second region (hydrocracking reaction region) of second reactor

DESCRIPTION OF THE INVENTION

Hereinafter, a method and apparatus for producing high value-added oil from waste plastic pyrolysis oil according to the present invention will be described in detail with reference to the accompanying drawings.

The drawings provided herein are provided by way of example so that the spirit of the present invention can be sufficiently transferred to those skilled in the art. Therefore, the present invention is not limited to the accompanying drawings provided below, but may be modified in many different forms. In addition, the accompanying drawings suggested below will be exaggerated in order to clear the spirit and scope of the present invention.

Technical terms and scientific terms used herein have the general meaning understood by those skilled in the art to which the present invention pertains unless otherwise defined, and a description for the known function and configuration unnecessarily obscuring the gist of the present invention will be omitted in the following description and the accompanying drawings.

A singular form of a term used herein may be construed to include a plural form as well unless otherwise indicated.

Numerical ranges as used herein include all possible combinations of lower and upper limits and all values within that range, increments logically derived from the form and width of the defined ranges, all values defined herein, and upper and lower limits of numerical ranges defined in different forms. Unless otherwise defined in the specification of the present invention, values out of a numerical range that may occur due to experimental errors or rounding of values are also included in the defined numerical range. "Including" mentioned herein is an open-ended description having an equivalent meaning to expressions such as "comprising", "containing", "having", "characterizing", and elements, materials, or processes not listed additionally are not excluded.

Unless specifically stated herein, the unit of % used means % by weight unless otherwise specified.

The term "layer" or "film" as used herein means that each material forms a continuum and has a relatively small dimension in a thickness compared to a width and a length. Accordingly, the term "layer" or "film" as used herein should not be interpreted as a two-dimensional flat plane.

Since waste plastic pyrolysis oil has different components and composition ratios compared to crude oil, when the conventional process of refining crude oil is applied to the refining of the waste plastic pyrolysis oil as it is, the process efficiency is lowered, the effect of refining impurities is not good, and especially, there is a limitation in that it is difficult to obtain refined oil satisfying the desired content of components, specifically, refined oil having a high content of naphtha and kerosene.

Therefore, a method and apparatus of refining waste plastic pyrolysis oil according to the present invention may stably obtain hydrocarbon oil having a high content of high value-added oil component containing naphtha and kerosene by using means described below, and may have an excellent impurity removal effect and an excellent process efficiency effect such as low energy consumption and minimized facility space.

In particular, the method and apparatus for refining waste plastic pyrolysis oil according to the present invention includes a means for performing refining and lightening of impurities in waste plastic pyrolysis oil in one reactor, even if a boiling point separation process such as the conventional process of refining crude oil is not additionally performed in advance, thereby providing not only excellent process efficiency, but also a refined hydrocarbon oil having a high content of oil component of naphtha and kerosene.

The method of refining waste plastic pyrolysis oil according to the present invention includes: a reactant introducing step of introducing the waste plastic pyrolysis oil containing light oil component and a hydrogen gas into a first reactor; a first hydrotreating step of producing first refined oil, from which impurities are primarily removed, by performing a primary hydrotreating reaction on the waste plastic pyrolysis oil in the first reactor under a first hydrotreating catalyst; an intermediate product introducing step of introducing a fluid containing the first refined oil introduced in the first hydrotreating step into a second reactor having a reaction space including a first region and a second region and introducing the fluid into the first region; a second hydrotreating step of producing second refined oil, from which impurities are secondarily removed, by performing a secondary hydrotreating reaction on an oil component in the fluid under a second hydrotreating catalyst in the first region; and a hydrocracking step of producing third refined oil containing naphtha and kerosene by performing a hydrocracking reaction on an oil component in a fluid containing the second refined oil introduced from the first region under a hydrocracking catalyst in the second region.

In addition, the method of refining waste plastic pyrolysis oil according to the present invention is performed through an apparatus for refining waste plastic pyrolysis oil including the first reactor and the second reactor. As a preferred example, as illustrated in FIG. 1, the apparatus, includes: a first reactor in which the waste plastic pyrolysis oil and a hydrogen gas are introduced, and the waste plastic pyrolysis oil undergoes a primary hydrotreating reaction under a first hydrotreating catalyst to produce first refined oil from which impurities are primarily removed; and a second reactor having, as inner space, a first region and a second region in which a fluid containing the first refined oil is introduced from the first reactor and oil component and hydrogen gas in the fluid react. Here, the first region is a region in which second refined oil from which impurities are secondarily removed is produced by performing a secondary hydrotreating reaction on the oil component in the fluid introduced from the first reactor under a second hydrotreating catalyst, and the second region is a region in which a fluid containing the second refined oil is introduced from the first region, and the oil component in the fluid undergoes a hydrocracking reaction under a hydrocracking catalyst to produce third refined oil containing naphtha and kerosene.

As illustrated in FIG. 1, the waste plastic pyrolysis oil and the hydrogen gas are introduced into the first reactor, and undergo a primary hydrotreating reaction in the first hydrotreating reaction region, which is the inner space of the first reactor. Specifically, a first hydrotreating reaction region, which is a region where the waste plastic pyrolysis oil and the hydrogen gas are a hydrotreating (HDT) reaction, is formed in the inner space of the first reactor, and the hydrotreating reaction is performed by bringing the waste plastic pyrolysis oil into contact with the hydrogen gas under a hydrotreating catalyst. As dechlorination, denitrification, desulphurization, and demetallation can be performed by performing the hydrotreating reaction in the first hydrotreating reaction region, olefin in the waste plastic pyrolysis oil is removed as well as other impurities are also removed from the waste plastic pyrolysis oil. Examples of the other impurities may include non-metal impurities such as chlorine, nitrogen, sulfur, oxygen, silicon, and phosphorus, metal impurities such as iron, nickel, calcium, magnesium, chromium, potassium, zinc, and aluminum, and the like.

Specifically, the olefin removal reaction may be performed as a main reaction in the first hydrotreating reaction region of the first reactor. In addition, the removal of the chlorine component, that is, the dechlorination reaction may be further performed together with the olefin removal reaction. As a result, by further improving the impurity removal and hydrocracking reaction efficiency in the second reactor at a rear stage, it is possible to obtain high value-added hydrocarbon oil having an excellent effect of refining impurities and an excellent yield of oil component including naphtha and kerosene.

As described above, by the presence of the first reactor at a front state of the second reactor, there is an effect of removing impurities and obtaining high value-added hydrocarbon oil having the excellent yield of oil component including naphtha and kerosene. However, when the first reactor is not included, the effect of removing impurities, in particular, a sufficient degree of olefin removal reaction may not be induced, and may significantly cause a differential pressure in the reactor. Accordingly, the stability of the hydrocracking catalyst in the second reactor located at the rear stage may be greatly reduced, so the effect is significantly reduced in terms of process operation, such as not being able to maintain the initial high efficiency performance for a long period of time. Therefore, when the first reactor is not included in the process of refining waste plastic pyrolysis oil, the high value-added hydrocarbon oil having the excellent effect of refining impurities and the excellent yield of oil component including naphtha and kerosene may not be obtained.

The waste plastic pyrolysis oil introduced into the first reactor produces first refined oil through a primary hydrotreating reaction, and a fluid containing the first refined oil and an unreacted hydrogen gas is introduced into the first region of the second reactor.

The fluid containing the first refined oil produced by passing through the first reactor is processed by sequentially passing through the first region and the second region of the second reactor, and is converted into hydrocarbon oil having a high content of oil component of naphtha and kerosene. In this case, the first region and the second region are specifically formed inside a single reactor, and each region may be distinguished and divided according to the type of reaction to be performed as described below.

The first region of the second reactor is a region in which the oil component and the hydrogen gas in the fluid containing the first refined oil produced by passing through the first reactor undergo a hydrotreating reaction, and a secondary hydrotreating reaction is performed by bringing the oil component into contact with the hydrogen gas under the second hydrotreating catalyst. Specifically, in the first region, the secondary hydrotreating reaction is performed to further perform dechlorination, denitrification, desulphurization, and demetallation, and chlorine, nitrogen, sulfur, other impurities other than metal, and olefin that have not yet been removed in the first reactor may be further removed. The fluid containing the second refined oil and the unreacted hydrogen gas produced by performing the secondary hydrotreating reaction on the waste plastic pyrolysis oil is introduced into the second region.

Specifically, the removal of the nitrogen component in the first region of the second reactor, that is, the denitrification reaction may be performed as the main reaction. When this is satisfied, by further improving the hydrocracking reaction efficiency in the second region, it is possible to obtain the high value-added hydrocarbon having the excellent effect of refining impurities and the excellent yield of oil component including naphtha and kerosene. More specifically, as the main reactions of the primary hydrotreating reaction of the first reactor, a dechlorination reaction or a dechlorination reaction and an olefin removal reaction may be performed, and as the main reaction of the secondary hydrotreating reaction of the second reactor, a denitrification reaction may be performed. In this way, when the hydrocracking reaction is performed after the olefin and/or the chlorine component are primarily removed with high efficiency in the first reactor and then the high content of nitrogen component is removed in the second reactor, it is possible to remarkably improve the effect of refining impurities and to obtain the high value-added hydrocarbon oil with a remarkably improved yield of oil component containing naphtha and kerosene.

As a specific means for sequentially performing the dechlorination reaction and the denitrification reaction, it may be preferable that the temperature of the secondary hydrotreating reaction and the temperature of the hydrocracking reaction are higher than that of the primary hydrotreating reaction. In a preferred embodiment, the temperature of the first hydrotreating reaction may be 100° C. or higher and less than 300° C., specifically 150° C. or higher and less than 300° C., more specifically 200° C. or higher and less than 300° C., and the temperature of the second hydrotreating reaction and the temperature of the hydrocracking reaction may be 300 to 500° C. independently from each other, specifically 320 to 450° C., more specifically 330 to 400° C. As a non-limiting example, when the temperature of the first reactor exceeds 300° C., the pyrolysis oil containing high-concentration olefin may be exposed to high temperature to quickly form Coke, and there may be a possibility of causing the differential pressure in the reactor and accelerating the generation rate of the differential pressure, so there is room for problems from a long-term operating point of view. However, this is only described as a preferred example, and the present invention is not limited thereto.

The second region of the second reactor is a region in which the fluid containing the second refined oil and the unreacted hydrogen gas produced by the secondary hydrotreating reaction is introduced from the first region and the oil component in the fluid and the hydrogen gas undergo a hydrocracking (HCK) reaction, and the hydrocracking reaction is performed by bringing the oil component of the second refined oil into contact with the hydrogen gas under the hydrocracking catalyst.

As a specific example, it is preferable that the fluid introduced into the first region and/or the second region reacts with the unreacted hydrogen gas in the hydrogen gas in the fluid, and in addition to the unreacted hydrogen gas, the hydrogen gas may be additionally supplied to the first region and/or second region through a separate hydrogen gas supply line, and the additionally supplied hydrogen gas may also react with the oil component in the fluid. In this way, when the hydrogen gas is additionally supplied to the first region and/or the second region through the separate hydrogen gas supply line, a reaction flow ratio of the oil component and the hydrogen gas may be more precisely controlled, for example, a hydrogen gas flow rate of the first hydrotreating reaction region in the first reactor, a hydrogen gas flow rate of the first region of the second reactor, and a hydrogen gas flow rate of the second region of the second reactor may be set differently for operation.

The reaction pressure in the present disclosure, specifically, the reaction pressure of the first hydrotreating step, the second hydrotreating step, and/or the hydrocracking step is may be performed at a pressure of 120 bar or less, specifically 95 bar or less, or 70 bar or less, specifically 10 to 120 bar, specifically 15 to 95 bar, or 20 to 70 bar. When this is satisfied, it may be preferable in terms of achieving excellent energy efficiency and process efficiency such as low energy consumption while achieving the above-described effect.

In particular, the method or apparatus of refining waste plastic pyrolysis oil according to the present invention is performed at the reaction pressure, specifically, the reaction pressure of the first hydrotreating step, the second hydrotreating step, and/or the hydrocracking step of 120 bar or less, specifically 95 bar or less, or 70 bar or less, specifically 10 to 120 bar, specifically 15 to 95 bar, or 20 to 70 bar, in terms of maximizing the content of oil component of naphtha and kerosene, and it may be preferable that a ratio of liquid hourly space velocity (LHSV) of the first region and the second region is 1:1 to 10, specifically 1:1.5 to 10, and more specifically 1:2 to 10. That is, when both the ratio of the pressure in the above range and the LHSV in the above range are satisfied, it is possible to achieve the excellent energy efficiency and process efficiency and the excellent effect of removing impurities and further improve the yield of naphtha and kerosene.

In the second reactor, the liquid hourly space velocity (LHSV) of the entire region including the first region and the second region and/or the liquid hourly space velocity of the first hydrotreating reaction region of the first reactor, that is, the liquid hourly space velocity of the entire inner space of the reactor in the present disclosure may be specifically 0.1 to 5 $h^{-1}$, specifically 0.2 to 3 $h^{-1}$, more specifically 0.3 to 2 $h^{-1}$, even more specifically 0.3 to 1 $h^{-1}$. When the LHSV of the entire inner space of the reactor satisfies the above range, the refined oil containing the high content of naphtha and kerosene may be stably obtained.

Specifically, the ratio of the liquid hourly space velocity (LHSV) of the first reactor and the second reactor may be 1:0.1 to 0.8. When this is satisfied, impurities may be effectively removed through the reaction of the first reactor and the reaction of the first region of the second reactor, and thus, the fluid containing the refined oil from which the impurities have been effectively removed is introduced into the second region of the second reactor, so the activity of the hydrocracking catalyst in the second region of the second reactor may be maintained to be high for a long period of time, thereby stably maintaining the high yield of naphtha and kerosene. In this way, by controlling the ratio of the liquid hourly space velocity (LHSV) of the first reactor and the second reactor to a specific range, it is possible to improve not only the process efficiency, but also improve the effect of removing impurities and the yield of naphtha and kerosene.

In the present disclosure, the reaction temperature, specifically, the reaction temperature of the first hydrotreating step, the second hydrotreating step, and/or the hydrocracking step is sufficient to implement the above-described effects, and may be sufficient as long as each reaction may be performed in each region, and these steps may be performed at a temperature of 200 to 500° C., specifically 250 to 450° C., more specifically 300 to 450° C. However, this is only described as a preferred example, and the present invention is not limited thereto.

In the present disclosure, the flow ratios of the waste plastic pyrolysis oil and the hydrogen gas, specifically, the flow ratios of the waste plastic pyrolysis oil and the hydrogen gas in the first hydrotreating step, the second hydrotreating step, and/or the hydrocracking step are sufficient to implement the above-described effects, and may be sufficient as long as the reaction may be performed in each region. For example, the waste plastic pyrolysis oil and the hydrogen gas may react at a volume flow ratio of 1:300 to 3,000, specifically, a volume flow ratio of 1:400 to 2,500, more specifically, a volume flow of 1:500 to 1,500 based on 1 atm and 25° C. However, this is only described as a specific example, and the present invention is not limited thereto.

As a specific example, the first reactor supplies hydrogen gas to the inner space of the reactor, and may further include a first hydrogen gas supply line provided on an outer wall corresponding to an inner wall of the inner space. More specifically, the first hydrogen gas supply line may be provided in communication with an upper end portion of the first reactor. Also, as described above, the hydrogen gas may be additionally supplied to the first region and/or the second region of the second reactor through a separate hydrogen gas supply line. As a specific example, the second reactor supplies the hydrogen gas to the first region and/or second region formed therein, and may further include a second hydrogen gas supply line provided on the outer wall corresponding to the inner wall of the reactor forming the first region and/or the second region.

As described above, the first hydrotreating catalyst for performing the primary hydrotreating reaction in the first reactor, the second hydrotreating catalyst for performing the secondary hydrotreating reaction in the first region of the second reactor, and the hydrocracking catalysts for performing the hydrocracking reaction in the second region of the second reactor may be provided in each region, and each catalyst may be a heterogeneous catalyst fixed to each region.

As long as the "catalyst" referred to in the present disclosure is capable of performing each corresponding reaction, various known in the art may be used, and is not particularly limited. Specifically, the "hydrotreating catalyst" or "hydrocracking catalyst" referred to in the present disclosure may include an active metal having a catalytic ability for each reaction, and for example, may be a catalyst in which an active metal is supported on a support. The active metal may include any one or two or more selected from, for example, molybdenum, nickel, cobalt, tungsten, and the like as long as the active metal has a catalytic ability to perform the required reaction. In addition, the catalyst may further include sulfur so that the catalytic ability of the active metal is activated to be metal sulfide. The support may be any support having durability capable of supporting and holding the active metal, and may include, for example, any one or two or more selected from: a material containing any one or two or more selected from silicon, aluminum, zirconium, magnesium, thorium, beryllium, titanium, and the like; an oxide of the material; and a carbon-based material containing any one or two or more selected from carbon black, activated carbon, graphene, carbon nanotubes, graphite, and the like. The active metal may be included in an amount of 0.01 to 20 wt %, specifically 0.1 to 10 wt %, based on the total weight of the catalyst. However, this is only described as a specific example, and the present invention is not limited thereto.

As a specific example, as the hydrotreating catalyst, various types of known catalysts may be used as long as catalysts may perform a hydrogenation reaction in which hydrogen is added to the hydrocarbon of the waste plastic pyrolysis oil. In detail, the hydrotreating catalyst may include any one or two or more selected from a hydrogenation desulphurization catalyst, a hydrogenation denitrification catalyst, a hydrogenation dechlorination catalyst, a hydrogenation demetallation catalyst, and the like. This hydrotreating catalyst may perform an olefin removal reaction while performing a desulphurization reaction, a denitrification reaction, a dechlorination reaction, and a demetallation reaction. In a specific embodiment, the hydrotreating catalyst may include an active metal containing molybdenum and nickel, and may be a catalyst including an active metal containing 0.1 to 30 wt % of molybdenum and 0.1 to 10 wt % of nickel based on the total weight of the catalyst, specifically, a catalyst including an active metal containing 1 to 15 wt % of molybdenum and 1 to 5 wt % of nickel. However, this is only described as a specific example, and the present invention is not limited thereto.

As a specific example, as the hydrotreating catalyst, various types of known catalysts may be used as long as catalysts may perform a decomposition reaction of hydrocarbon while hydrogen is added to the hydrocarbon of the waste plastic pyrolysis oil. In a specific embodiment, the hydrotreating catalyst may include an active metal containing nickel and tungsten, and may be a catalyst which is a support on which an active metal containing 0.1 to 10 wt % of nickel and 0.1 to 30 wt % of tungsten based on the total weight of the catalyst is supported, specifically, a catalyst which is a support on which an active metal containing 1 to 5 wt % of nickel and 1 to 15 wt % of tungsten is carried. However, this is only described as a specific example, and the present invention is not limited thereto.

The "waste plastic pyrolysis oil" referred to in the present disclosure means a hydrocarbon oil mixture produced by pyrolyzing waste plastic. In this case, the waste plastic may mean solid or liquid waste related to synthetic polymer compounds such as waste synthetic resin, waste synthetic fiber, waste synthetic rubber, and waste vinyl. The hydrocarbon oil mixture may contain impurities such as chlorine compounds, nitrogen compounds, and metal compounds in addition to the hydrocarbon oil, and may contain impurities in the form of compounds in which chlorine, nitrogen, or metal in the hydrocarbon are bonded, and may contain hydrocarbons in the form of olefin. As a specific example, the waste plastic pyrolysis oil may contain 300 ppm or more of nitrogen, 30 ppm or more of chlorine, 20 vol % of olefin (based on 1 atm and 25° C.) or more, and 1 vol % or more of conjugated diolefin (based on 1 atm and 25° C.)

The waste plastic pyrolysis oil may include an oil component of various boiling point ranges, and the composition ratio of oil component contained in the waste plastic pyrolysis oil is different from general crude oil. As a specific example, the waste plastic pyrolysis oil may be hydrocarbon oil containing 1 to 40 wt % of first oil component having a boiling point of less than 150° C., 1 to 50 wt % of second oil component having a boiling point of 150° C. or higher and less than 265° C., a 1 to 50 wt % of third oil component having a boiling point of 265° C. or higher and less than 340° C., and 1 to 60 wt % of fourth oil component having a boiling point of 340° C. or higher, and specifically, may be hydrocarbon oil containing 5 to 20 wt % of first oil component having a boiling point of less than 150° C., 15 to 30 wt % of second oil component having a boiling point of 150° C. or higher and less than 265° C., 15 to 30 wt % of third oil component having a boiling point of 265° C. or higher and less than 340° C., and 20 to 60 wt % of fourth oil component having a boiling point of 340° C. or higher. In this case, the light oil component may include the first oil component and the second oil component, the "first oil component" referred to in the present disclosure may be naphtha, and the "second oil component" referred to in the present disclosure may be kerosene.

When the waste plastic pyrolysis oil containing oil component that satisfies the composition ratio in the above range is targeted, there is an effect of maximizing the yield of light oil (naphtha, kerosene), which is not well implemented especially for heavy oil. That is, when the above-described means are targeted for heavy oil, the above effect may not be exhibited well, and only when the waste plastic pyrolysis oil is used, it is possible to produce the refined oil having a remarkably high content of light oil such as naphtha and kerosene.

As described above, by using the method or apparatus according to the present invention, the content of impurities in the waste plastic pyrolysis oil may be remarkably reduced, and in particular, the content of light oil component containing naphtha and kerosene may be maximized. Specifically, the third refined oil produced in the second region, that is, the third refined oil produced in the hydrocracking step may be a hydrocarbon oil containing a high content of light oil component containing 10 wt % or more of naphtha and 25 wt % or more of kerosene.

Hereinafter, the present invention will be described in detail with reference to Examples, but these are for describing the present invention in more detail, and the scope of the present invention is not limited to the Examples below.

Example 1

An apparatus for refining waste plastic pyrolysis oil in which a first reactor having a first hydrotreating catalyst provided in an inner space thereof and a second reactor having a second hydrotreating catalyst fixed on an upper portion of the inner space and a hydrocracking catalyst fixed on a lower portion thereof are connected in series is designed as illustrated in FIG. 1. The waste plastic pyrolysis oil was put into the apparatus, and the apparatus was operated to obtain cracked refined oil from which impurities are removed from the waste plastic pyrolysis oil. In this case, the waste plastic pyrolysis oil is a hydrocarbon oil mixture that contains a high content of impurities of 200 ppm or more of nitrogen (N), 30 ppm or more of chorine (Cl), 20 vol % or more of olefin, and 1 vol % or more of conjugated diolefin and contains an oil component having a composition ratio of the following Table 2.

Specifically, as illustrated in FIG. 1, the waste plastic pyrolysis oil and the hydrogen gas were introduced into the inner space of the first reactor, that is, the first hydrotreating reaction region. In the first hydrotreating reaction region of the first reactor, the waste plastic pyrolysis oil and the hydrogen gas undergo a primary hydrotreating reaction under a first hydrotreating catalyst, so the first refined oil from which olefin is removed and non-metal impurities (chlorine, nitrogen, sulfur, oxygen, phosphorus, silicon, etc.) and other impurities including metal impurities (iron, nickel, calcium, magnesium, chromium, potassium, zinc, aluminum, etc.) are primarily removed was produced. In this case, the inner space of the first reactor was filled with a NiMo sulfide-based catalyst as the first hydrotreating catalyst to cause the primary hydrotreating reaction.

Subsequently, the fluid containing the first refined oil and the unreacted hydrogen gas discharged from the first reactor was introduced into the first region located at the upper portion of the inner space of the second reactor. In the first region, the oil component and the unreacted hydrogen gas in the fluid undergo a secondary hydrotreating reaction under the second hydrotreating catalyst, so the second refined oil from which the residual olefin is removed and other impurities including non-metallic impurities and metal impurities are secondarily removed was produced. In this case, the first region of the second reactor was filled with, as the second hydrotreating catalyst, the same catalyst as the first hydrotreating catalyst to cause the secondary hydrotreating reaction.

Then, the fluid containing the second refined oil produced in the first region located at the upper portion of the inner space of the second reactor was introduced into the lower portion of the inner space of the second reactor, that is, the second region located at the lower portion of the first region. In the second region, the oil component and the unreacted hydrogen gas in the fluid undergo the hydrocracking reaction under the hydrocracking catalyst to produce third refined oil including naphtha and kerosene. In this case, the second region of the second reactor was filled with a NiW sulfide-based catalyst as the hydrocracking catalyst to cause the hydrocracking reaction.

Operating conditions of the apparatus for refining waste plastic pyrolysis oil including the first reactor and the second reactor are shown in Table 1 below.

TABLE 1

| Main reaction | First reactor Olefin removal reaction/ Dechlorination reaction | Second reactor Denitrification reaction/ Cracking reaction |
|---|---|---|
| Temperature(° C.) | 250 | 370 |
| Pressure(bar) | 50 | |
| H$_2$/Oil supply volume flow ratio | 840 | |
| Total LHSV(Liquid hourly space velocity) (h$^{-1}$) of reactor | 0.47 | |
| Total LHSV ratio of first reactor and second reactor | 2:1 | |
| LHSV ratio of first region and second region in second reactor | — | 1:2.3 |

Example 2-4

As shown in Table 2 below, refined oil was obtained from waste plastic pyrolysis oil in the same manner as in Example 1, except that a reaction temperature among the operating conditions of a second reactor in Example 1 was changed from 370° C. to 380, 390 or 400° C.

Example 5-6

Refined oil was obtained from waste plastic pyrolysis oil in the same manner as in Example 1, except that a composition of an oil component of the waste plastic pyrolysis oil in Example 1 was controlled to be as shown in Table 2 below through fractional distillation.

Comparative Example 1

Refined oil was obtained in the same manner as in Example 1, except that heavy oil having a specific composition ratio instead of waste plastic pyrolysis oil in Example 1 was used as shown in Table 2 below.

Comparative Example 2

Refined oil was obtained in the same manner as in Example 1, except that a total LHSV ratio of first and second reactors in Example 1 was 1:2.

[Experimental Example 1] Evaluation of Composition Ratio of Refined Oil According to Reactor Structure, Operating Condition, and Feed Type The contents of naphtha and kerosene in the refined oil prepared in Examples 1 to 6 and Comparative Examples 1 and 2 were measured, and the results are shown in Table 2 below.

TABLE 2

| | | Example | | | | | | Comparative Example | |
|---|---|---|---|---|---|---|---|---|---|
| | | 1 | 2 | 3 | 4 | 5 | 6 | 1 | 2 |
| Oil Feed | Waste plastic pyrolysis oil | | | o | | | | x | o |
| | Heavy oil | | | x | | | | o | x |
| First oil component having boiling point of less than 150° C. | | | 11.2 | | | 0 | 0 | 0 | 11.2 |
| Second oil component having boiling point of 150° C. or higher and lower than 265° C. | | | 24.0 | | | 0 | 27.0 | 0 | 24.0 |
| Third oil component having boiling point of 265° C. or higher and lower than 340° C. | | | 20.7 | | | 31.9 | 23.3 | 0 | 20.7 |
| Fourth oil component having boiling point of 340° C. or higher | | | 44.1 | | | 68.1 | 49.7 | 100.0 | 44.1 |
| Reaction temperature (° C.) | First reactor | | 250 | | | 250 | | 250 | |
| | Second reactor | 370 | 380 | 390 | 400 | 370 | | 370 | |
| Total LHSV ratio of first reactor and second reactor | | | | | | 2:1 | | | 1:2 |
| Naphtha content in refined oil (wt %) | | 12.1 | 11.4 | 12.8 | 17.0 | 2.7 | 5.4 | 0 | 8.0 |
| Kerosene content in refined oil (wt %) | | 27.6 | 28.4 | 29.8 | 33.0 | 7.4 | 15.4 | 3.6 | 20.1 |

A method and apparatus for refining waste plastic pyrolysis oil according to the present invention have an effect of converting the waste plastic pyrolysis oil into high value-added hydrocarbon oil having a high content of naphtha and kerosene.

In addition, a method and apparatus for refining waste plastic pyrolysis oil according to the present invention have an effect of producing refined oil having a remarkably low content of impurities such as chlorine, nitrogen, oxygen, and metal.

In addition, a method and apparatus for refining waste plastic pyrolysis oil according to the present invention have an effect of operating under milder process conditions, having excellent process efficiency, and having high process stability to be able to continuously produce refined oil.

The invention claimed is:

1. A method of refining waste plastic pyrolysis oil, comprising the steps of:
    a reactant introducing step of introducing the waste plastic pyrolysis oil containing a light oil component and a hydrogen gas into a first reactor;
    a first hydrotreating step of producing a first refined oil, from which impurities are primarily removed, by performing a primary hydrotreating reaction on the waste plastic pyrolysis oil in the first reactor under a first hydrotreating catalyst;
    an intermediate product introducing step of introducing a fluid containing the first refined oil introduced in the first hydrotreating step into a second reactor having a reaction space including a first region and a second region and introducing the fluid into the first region;
    a second hydrotreating step of producing a second refined oil, from which impurities are secondarily removed, by performing a secondary hydrotreating reaction on an oil component in the fluid under a second hydrotreating catalyst in the first region; and
    a hydrocracking step of producing a third refined oil containing naphtha and kerosene by performing a hydrocracking reaction on an oil component in a fluid containing the second refined oil introduced from the first region under a hydrocracking catalyst in the second region,
    wherein a ratio of a liquid hourly space velocity (LHSV) of the first reactor and the second reactor is 1:0.1 to 0.8.

2. The method of claim 1, wherein, in the hydrotreating step or the hydrocracking step, the reaction is performed at a pressure of 10 to 120 bar.

3. The method of claim 2, wherein a ratio of a liquid hourly space velocity (LHSV) of the first region and the second region is 1:1 to 10.

4. The method of claim 1, wherein the primary hydrotreating reaction includes a dechlorination reaction, and
    the secondary hydrotreating reaction includes a denitrification reaction.

5. The method of claim 4, wherein a temperature of the secondary hydrotreating reaction and a temperature of the hydrocracking reaction are higher than that of the primary hydrotreating reaction.

6. The method of claim 5, wherein the temperature of the first hydrotreating reaction is 100° C. or higher and less than 300° C., and
    the temperature of the secondary hydrotreating reaction and the temperature of the hydrocracking reaction are 300 to 500° C. independently from each other.

7. The method of claim 1, wherein, in the first hydrotreating step, the second hydrotreating step, or the hydrocracking step, the waste plastic pyrolysis oil and a hydrogen gas react at a volume flow ratio of 1:300 to 3,000 based on 1 atm and 25° C.

8. The method of claim 1, wherein the waste plastic pyrolysis oil is a hydrocarbon oil containing 1 to 40 wt % of a first oil component having a boiling point of less than 150° C., 1 to 50 wt % of a second oil component having a boiling point of 150° C. or higher and less than 265° C., 1 to 50 wt % of a third oil component having a boiling point of 265° C. or higher and less than 340° C., and 1 to 60 wt % of a fourth oil component having a boiling point of 340° C. or higher, and the light oil component includes the first oil component and the second oil component.

9. The method of claim 1, wherein the third refined oil produced in the hydrocracking step contains 10 wt % or more of naphtha and 25 wt % or more of kerosene.

10. The method of claim 1, wherein the first hydrotreating catalyst, the second hydrotreating catalyst, or the hydrocracking catalyst is a heterogeneous catalyst fixed inside each reactor.

11. The method of claim 10, wherein the first hydrotreating catalyst, the second hydrotreating catalyst, or the hydrocracking catalyst is a catalyst in which an active metal containing any one or two or more selected from molybdenum, nickel, cobalt, and tungsten is supported on a support.

12. An apparatus for refining waste plastic pyrolysis oil, comprising:

a first reactor in which the waste plastic pyrolysis oil and a hydrogen gas are introduced, and the waste plastic pyrolysis oil undergoes a primary hydrotreating reaction under a first hydrotreating catalyst to produce a first refined oil from which impurities are primarily removed; and a second reactor having, as an inner space, a first region and a second region in which a fluid containing the first refined oil is introduced from the first reactor and an oil component and a hydrogen gas in the fluid react, wherein the first region is a region in which a second refined oil from which impurities are secondarily removed is produced by performing a secondary hydrotreating reaction on the oil component in the fluid introduced from the first reactor under a second hydrotreating catalyst, wherein the second region is a region in which a fluid containing the second refined oil is introduced from the first region, and the oil component in the fluid undergoes a hydrocracking reaction under a hydrocracking catalyst to produce a third refined oil containing naphtha and kerosene, and wherein a ratio of a liquid hourly space velocity (LHSV) of the first reactor and the second reactor is 1:0.1 to 0.8.

13. The apparatus of claim 12, wherein the second region is formed under the first region, and a fluid containing the second refined oil and an unreacted hydrogen gas discharged from the first region flows in the second region.

14. The apparatus of claim 12, wherein the first region and the second region are controlled to maintain a reaction pressure of 10 to 120 bar.

15. The apparatus of claim 12, wherein the reactor is controlled so that a ratio of a liquid hourly space velocity (LHSV) of the first region and the second region is 1:1 to 10.

16. The apparatus of claim 12, wherein a temperature of the first hydrotreating reaction is 100° C. or higher and less than 300° C., and a temperature of the secondary hydrotreating reaction and a temperature of the hydrocracking reaction are 300 to 500° C. independently from each other.

* * * * *